May 22, 1956
R. W. MORITZ
2,746,163
FLANGE LEVEL
Filed Dec. 5, 1951
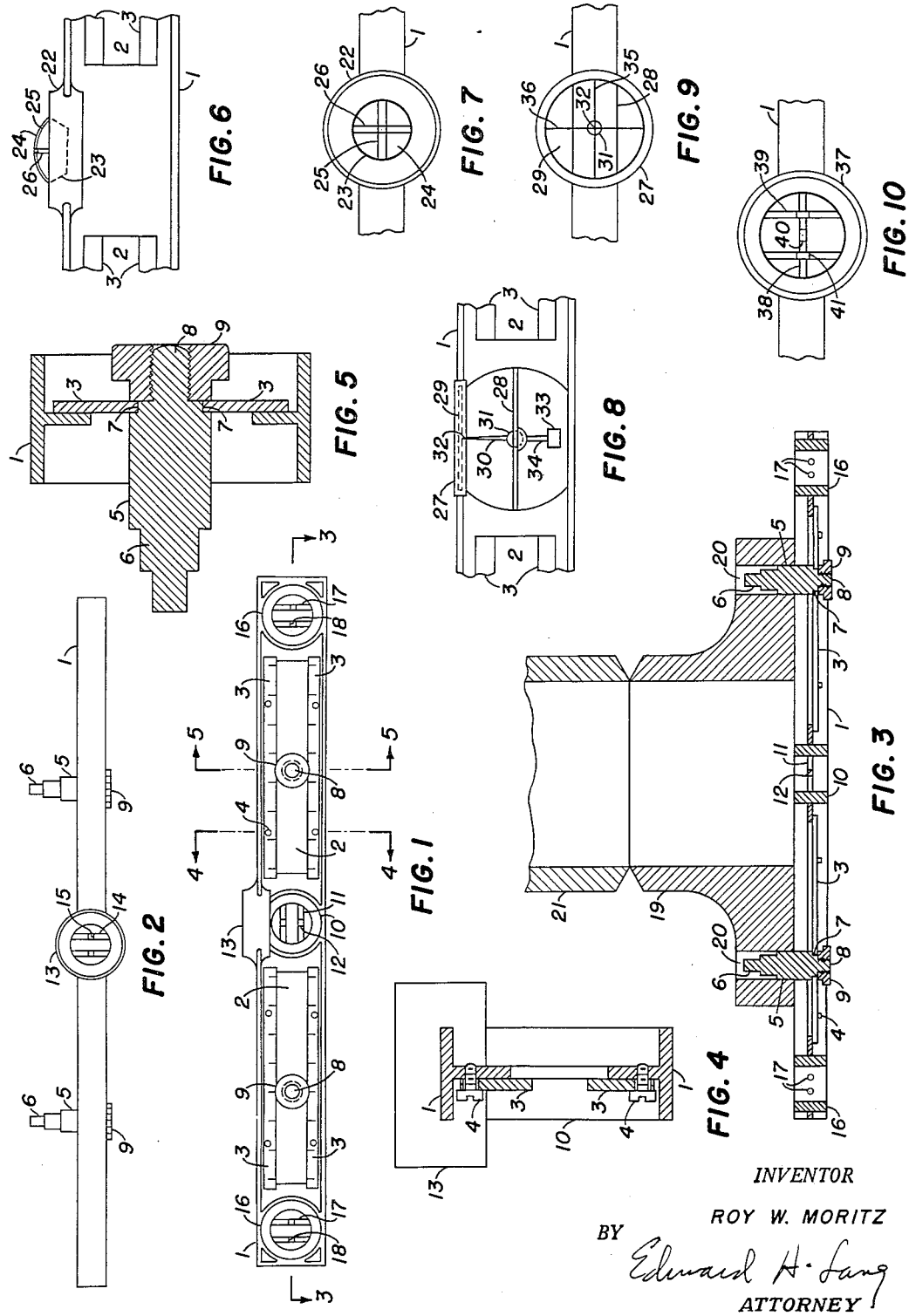
INVENTOR
ROY W. MORITZ
BY
Edward H. Lang
ATTORNEY " # United States Patent Office 2,746,163
Patented May 22, 1956

2,746,163

FLANGE LEVEL

Roy W. Moritz, East Toledo, Ohio, assignor to The Pure Oil Company, Chicago, Ill., a corporation of Ohio Application December 5, 1951, Serial No. 259,991

1 Claim. (Cl. 33—207)

This invention relates to the art of fabricating welded-flange joints and particularly to instruments for aligning a flange relative to a metallic pipe or other metallic equipment to which the flange is to be attached by welding.

In the art of fabricating welded-flange joints it has heretofore been necessary to employ at least three men to carry out the operations involved. Before the actual welding operation is begun, the flange must be properly positioned relative to the pipe or equipment to which it is to be attached. This positioning of the flange is at best a time consuming and troublesome task, requiring the services of several men, and inaccurate positioning of the flange is the rule rather than the exception. To accomplish this positioning operation, the flange neck is first placed against the free end of the pipe and held in this position. In order to position the flange so that its bolt holes will properly align with the bolt holes of a matching flange of a second pipe or item of equipment, the bolt holes are set at a predetermined rotational position by holding a level across two opposing bolt holes and rotating the flange until a line connecting the center lines of these bolt holes coincides with a horizontal reference plane. This adjustment is extremely important when a flanged fitting, such as an elbow, a T, a flanged valve, or a flanged item of equipment, is to be attached to the pipe flange, since a slight inaccuracy in the rotational position of the flange bolt holes will result in an undesirable change of direction of all subsequent piping or an inaccurately positioned item of equipment. For the same reasons, the face of the flange must also be placed in a predetermined position. This predetermined position of the face of the flange is in a plane perpendicular to the horizontal plane of the pipe or in a plane 90° removed from a horizontal reference plane. This alignment is accomplished by holding a second level against the face of the flange and moving the top or bottom of the flange, as the case requires, until the flange face is in a plane perpendicular to a horizontal reference plane. Thus it may be seen that while one man is holding the flange and making the proper adjustments a second man must hold the level and direct the positioning. This divided operation alone is responisble for many inaccuracies, but when two separate adjustments of this nature are to be performed the opportunity for error is greatly increased. In addition to the human errors involved in having two men do a job which could more accurately be done by one man, the necessity of making a second and unrelated adjustment introduces the possibility of completely destroying the advantage which has been obtained through the first adjustment.

It is therefore an object of my invention to provide a welder's flange level which can be used to simultaneously determine the rotational position of a pair of flange bolt holes and the alignment of the face of the flange relative to a horizontal reference plane.

Another object of my invention is to provide a welder's flange level which can be supported on a flange and which can be used to simultaneously determine the rotational position of the flange bolt holes and the alignment of the face of the flange relative to a horizontal reference plane.

A further object of my invention is to provide a welder's flange level which can be supported on any size flange, regardless of the relative spacing of the flange bolt holes, and which can be used to simultaneously determine the rotational position of the flange bolt holes and the alignment of the face of the flange relative to a horizontal reference plane.

Another and further object of my invention is to provide a welder's flange level which can be supported on any size flange, regardless of the number, size, or relative spacing of the flange bolt holes, and which can be used to simultaneously determine the rotational position of the flange bolt holes and the alignment of the face of the flange relative to a horizontal reference plane.

Other and further objects of my invention will be apparent from the following description of my invention taken in connection with the accompanying drawings wherein Figure 1 is a front elevational view of one species of my flange level. Figure 2 is a plan view of the species of my flange level shown in Figure 1. Figure 3 is a horizontal section on line 3—3 of Figure 1 showing my flange level in use in conjunction with a welding flange and a pipe. Figure 4 is an enlarged vertical section on line 4—4 of Figure 1 showing the constructional features of a part of my flange level. Figure 5 is an enlarged vertical section on line 5—5 of Figure 1 showing the constructional features of another part of my flange level. Figure 6 is a fragmentary front elevational view of a second species of my flange level showing the construction of a second levelling element. Figure 7 is a fragmentary plan view of the species of my flange level shown in Figure 6. Figure 8 is a fragmentary front elevational view of a third species of my flange level showing the constructional features of a third levelling element. Figure 9 is a fragmentary plan view of the species of my flange level illustrated in Figure 8. Figure 10 is a fragmentary plan view of a fourth species of my flange level showing the constructional features of a fourth levelling element.

Referring more in detail to the drawings it will be seen that 1 indicates generally an elongated body member having a longitudinal axis, a transverse axis normal to the longitudinal axis, and a vertical axis perpendicular to the other two axes. Body member 1 is formed with two elongated apertures 2. Body member 1 may be an elongated metallic I-beam member as ilustrated in the preferred embodiment of my invention, or it may be an elongated bar of wood or metal. Attached to the front face of body member 1 and extending along the longitudinal axis thereof are guide members 3, the inner edges of which extend beyond the longitudinal boundaries of and form slideways within apertures 2. Guide members 3 may be attached to body member 1 by threaded bolts 4, or they may be attached by any other suitable means such as welding. It is also within the purview of my invention to have guide members 3 formed as an integral part of body member 1.

Slidably mounted in the slideways formed by guide members 3 are a pair of cylindrical bosses 5, the center lines of bosses 5 being parallel to the transverse axis of body member 1. One end 6 of boss 5 is machined to form a series of cylindrical sections of decreasing diameter, each of these sections being of a diameter equal to the diameter of a standard size flange bolt hole and adapted to enter and frictionally engage such flange bolt holes. Intermediate the ends of boss 5 are a pair of flat sided opposing depressions 7 adapted to engage and slide along the free edges of guide members 3. The opposite end 8 of boss 5 forms a threaded bolt of smaller diameter than the main body of boss 5. Thumb nut 9 is internally threaded and adapted to engage the threaded end 8 of boss 5. Thumb nut 9 and the main body portion of boss 5 are of a diameter sufficiently large to overlap and frictionally clamp against the inner edges of guide members 3 when the depressions 7 of boss 5 are positioned between guide members 3. Other means of clamping boss 5 to guide members 3 and of freeing boss 5 for sliding movement along guide members 3 may also be employed, such as a spring loaded button element mounted on end 8 of boss 5 adapted to hold boss 5 and the button in clamping position against guide members 3 by the tension of the spring. Bosses 5 may also be slidably mounted on the top or bottom edge of body member 1 by a sleeve type mounting. Guide members 3 may be provided with suitable markings indicating the correct position of bosses 5 for each standard flange size. By thus marking guide members 3 bosses 5 may be correctly spaced apart to fit the bolt holes of a selected flange. End 6 of boss 5, which is adapted for insertion in a flange bolt hole, may be of any design which will permit its use in a variety of standard size flange bolt holes. For example, it may be machined to taper toward its end or it may be a diametrically expandable cylinder of a resilient material which will expand or contract as pressure is increased or reduced by thumb nut 9.

In one species of my invention, illustrated in Figures 1, 2 and 3, a gravity actuated levelling element 10 is designed to indicate the digression of the longitudinal axis of body member 1 from a horizontal reference plane. Levelling element 10, mounted in a recess in body member 1, includes one or more hermetically sealed, transparent, cylindrical vials 11 disposed parallel to the longitudinal axis of body member 1 and containing a mobile liquid having an air bubble formed in its upper surface. A pair of reference markings 12 passing circumferentially about vial 11 are visually cooperable with the air bubble formed within vial 11, reference markings 12 being positioned on vial 11 in such a manner that the longitudinal axis of body member 1 will coincide with a horizontal reference plane when the air bubble formed of within vial 11 is midway between reference markings 12.

Levelling element 13 is of substantially the same construction as levelling element 10 except that vials 14 are disposed parallel to the transverse axis of body member 1 and reference markings 15 are so positioned that the transverse axis of body member 1 will coincide with a horizontal plane when the bubble formed within vial 14 is midway between reference markings 15.

Levelling elements 16 are also similar in construction to levelling element 10 except that vials 17 are perpendicular to both the longitudinal and transverse axes of body member 1 and parallel to the vertical axis of body member 1 and reference markings 18 are so positioned that the vertical axis of body member 1 will coincide with a horizontal reference plane when the bubble formed within vial 17 is midway between reference markings 18.

The operation of my flange level is illustrated in Figure 3 in connection with a welding flange 19 having bolt holes 20, and a metal pipe 21. Thumb nuts 9 are turned counterclockwise until bosses 5 move freely along the slideways formed by guide members 3. Bosses 5 are then moved along guide members 3 until they are the same distance apart as a pair of opposing bolt holes 20 of flange 19. Thumb nuts 9 are then turned clockwise to secure bosses 5 in clamping position at the determined points on guide members 3. Alternately, if markings indicating the distance between the bolt holes of various flanges are positioned on guide members 3, bosses 5 may be clamped in position at the points designated for the particular flange. Bosses 5 are then inserted in bolt holes 20 with sufficient force to frictionally engage in inner surfaces of bolt holes 20. Flange 19, having the level attached thereto, is now placed in position against pipe 21. The operator holding the flange then rotates the flange until the air bubble contained within vial 11 of levelling element 10 is midway between reference markings 12. When this adjustment has been made the longitudinal axis of body member 1 will coincide with a horizontal reference plane and a line connecting the center lines of bolt holes 20 will also coincide with a horizontal reference plane. The bolt holes 20 of flange 19 are now in their predetermined rotational position. The operator holding the flange then moves the top or bottom of flange 19 until the bubble contained within vial 14 of levelling element 13 is midway between reference markings 15. In this position the transverse axis of body member 1 will coincide with a horizontal reference plane and the face of flange 19 will be in a plane perpendicular to the horizontal reference plane. Flange 19 is now in position for welding to pipe 21.

If desired the flange level may be positioned on flange 19 in such a manner that its longitudinal axis is in a vertical position relative to a horizontal reference plane. By thus positioning the flange level on flange 19 the flange level can be used in confined places, such as on installations close to a wall, where space limitations will not permit the use of the level in its horizontal position. In this position levelling elements 16 will determine the proper rotational position of flange bolt holes 20 and levelling element 13 will indicate when the face of flange 19 is in the plane perpendicular to a horizontal reference plane. Although levelling elements 16 indicate the point of rotation at which a line connecting the center lines of the bolt holes in which bosses 5 are inserted is perpendicular to a horizontal reference plane, by a proper selection of this pair of bolt holes a line connecting the center lines of a second pair of bolt holes will coincide with a horizontal reference plane. For example, if a flange has four bolt holes and bosses 5 are inserted in two consecutive bolt holes, the alignment of these bolt holes in a vertical position will place a second pair of bolt holes in a horizontal position. Likewise, inserting bosses 5 in any pair of bolt holes of a flange having eight bolt holes will align the second pair of bolt holes in a horizontal plane. Since the number of bolt holes in all standard flanges are mutiples of 4, it is apparent that aligning one pair of bolt holes in a vertical position will align a second pair of bolt holes in a horizontal position.

A second species of my flange level includes a single levelling element 22, mounted in a recess in body member 1, as illustrated in Figures 6 and 7. Levelling element 22 is made up of a hermetically sealed reservoir 23, depressed in the frame of levelling element 22, having a convex transparent cover 24. The transparent cover of reservoir 23 may also be a flat plate. Hermetically sealed within reservoir 23 is a mobile liquid having an air bubble formed in its upper surface. Positioned on cover 24 of reservoir 23 and visually cooperable with the air bubble formed within reservoir 23 are a pair of reference markings 25, disposed parallel to the longitudinal axis of body member 1, and a pair of reference markings 26, disposed parallel to the transverse axis of body member 1 and to the center lines of bosses 5. The intersection of reference markings 25 and 26 form a square in the center of reservoir 23. When the longitudinal axis of body member 1 and a line connecting the center lines of flange bolt holes 20 coincide with horizontal reference plane, the bubble formed within reservoir 23 will be midway between reference markings 26; and when the transverse axis of body member 1 coincides with a horizontal reference plane and the face of flange 19 is in a plane perpendicular to a horizontal reference plane, the bubble formed within reservoir 23 will be midway between reference markings 25. In other words, when the bubble formed within reservoir 23 is in the center of the square formed by the intersection of reference markings 26 and 25, both the bolt holes 20 of flange 19 and the face of flange 19 are properly aligned, and flange 19 is in position for welding to pipe 21. Reference markings 25 and 26 may also be single intersecting lines indicating the proper position of flange 19 when the air bubble formed within reservoir 23 is centered at the point of intersection of reference markings 25 and 26.

Another species of my flange level includes a levelling element designated generally as 27 in Figures 8 and 9. Levelling element 27 is mounted in an aperture in body member 1 and is composed of a support element 28 mounted within the aperture intermediate the top and bottom thereof, a transparent cover 29 across the top of the aperture, and a gravity actuated index element 30. Transparent cover 29 may be flat or curved in form so long as it is in close proximity to index element 30. Index element 30 is journalled intermediate its ends on support element 28 by a ball and socket joint 31 or by any other suitable means permitting arcuate movement of index element 30. The upper end 32 of index element 30 is formed as a sharp pointer, while pendulum weight 33 depends from the lower end 34 of index element 30. Positioned on cover 29 and visually cooperable with the pointed end 32 of index element 30 are intersecting reference markings 35, disposed parallel to the longitudinal axis of body member 1, and 36, disposed parallel to the transverse axis of body 1 and to the center lines of bosses 5. The point of intersection of reference markings 35 and 36 is directly above the point of journalling of index element 30, and the pointed end 32 of index element 30 will be directly below this point of intersection when the longitudinal axis of body member 1 and the transverse axis of body member 1 coincide with a horizontal reference plane. When the flange level is positioned on flange 19 the pointed end 32 of index element 30 will be directly below the point of intersection of reference markings 35 and 36 if the bolt holes 20 of flange 19 are in their proper rotational position and the face of flange 19 is perpendicular to a horizontal reference plane.

The species of my flange level illustrated in Figure 10 includes a single levelling element 37 mounted on body member 1. Levelling element 37 is composed of a liquid-containing transparent vial 38, disposed parallel to the longitudinal axis of body member 1, and two liquid-containing transparent vials 39, disposed parallel to the transverse axis of body member 1. Vials 38 and 39 each contain a mobile liquid hermetically sealed therein having an air bubble formed in its upper surface. Reference markings 40 and 41 are disposed circumferentially about vials 38 and 39 respectively and are visually cooperable with the air bubble formed within the respective vials. Vials 38 and 39 are positioned within levelling element 37 in such a manner that reference markings 40 and 41 will be visually displaced from one another when viewed from above. In using this species of my flange level the bubble contained within vial 38 is observed when determining the rotational position of bolt holes 20 and the bubble contained within vial 39 is observed when determining the alignment of the face of flange 19. That is, when the bubble contained within vial 38 is midway between reference markings 40 the longitudinal axis of body member 1 and a line joining the center lines of bolt holes 20 will coincide with a horizontal plane; and when the bubble contained within vial 39 is midway between reference markings 41 the transverse axis of body member 1 will coincide with a horizontal reference plane and the face of flange 19 will be in a plane perpendicular to a horizontal reference plane.

It is believed that the nature of my invention together with its many advantages will be clear to those skilled in the art without further detailed description.

It is to be understood that while I have herein illustrated and described certain preferred embodiments of my invention I do not wish to thereby limit the scope of my invention to the embodiments illustrated and described.

Having thus described my invention, what is claimed as new and useful is:

In a flange level for simultaneously determining the rotational position of a pair of flange bolt holes and the alignment of the flange relative a horizontal reference plane, the combination comprising an elongated guide body member having a longitudinal axis and a transverse axis normal to said longitudinal axis, said body member having longitudinal straight-edged slots intermediate the middle and ends thereof, bosses slidably mounted in said slots, said bosses having end body portions extending on one side of said guide body member adapted to frictionally engage said flange bolt holes, adjustable nuts at the other ends of said bosses, a pair of flat sided opposing depressions intermediate the ends of said bosses, the inner surfaces of said nuts and the flat sides of said depressions engaging opposite edges on each side of said slots to guidably force and hold said bosses perpendicular within the flange bolt holes, a single hermetically sealed bubble-containing liquid reservoir within said body member, said reservoir having a transparent cover, a pair of parallel longitudinal reference markings and a pair of parallel transverse reference markings intersecting normal thereto in said cover, said reference markings forming a square visually registering with said bubble to thereby indicate any digression of said longitudinal and transverse axes from said reference plane.

References Cited in the file of this patent

UNITED STATES PATENTS

| | | |
|---|---|---|
| 1,134,297 | Tillery | Apr. 6, 1915 |
| 1,796,743 | Biedenfeld | Mar. 17, 1931 |
| 1,846,787 | Buchmuller | Feb. 23, 1932 |
| 2,203,992 | Lutz | June 11, 1940 |
| 2,316,777 | Fell | Apr. 20, 1943 |
| 2,323,039 | Hill | June 29, 1943 |
| 2,358,564 | Donaldson | Sept. 19, 1944 |
| 2,428,213 | Gloede | Sept. 30, 1947 |
| 2,514,492 | Hayward | July 11, 1950 |
| 2,531,799 | Zumwalt | Nov. 28, 1950 |

FOREIGN PATENTS

| | | |
|---|---|---|
| 573,748 | Germany | June 4, 1931 |